United States Patent [19]

Wilson et al.

[11] Patent Number: 5,362,516
[45] Date of Patent: Nov. 8, 1994

[54] METHOD OF PREPARING AN ADHESIVE ARTICLE

[75] Inventors: Kenneth D. Wilson, Stillwater, Minn.; Larry A. Meixner, St. Croix Falls; Sharon R. Bemis, Osceola, both of Wis.; Clyde D. Calhoun; Buren R. Ree, both of Stillwater, both of Minn.

[73] Assignee: Minnesota Mining and Manufacturing Company, St. Paul, Minn.

[21] Appl. No.: 163,090

[22] Filed: Dec. 7, 1993

Related U.S. Application Data

[62] Division of Ser. No. 959,456, Oct. 9, 1992, Pat. No. 5,296,277.

[51] Int. Cl.$^5$ .............................................. B05D 5/10
[52] U.S. Cl. ............................. 427/207.1; 427/208.6; 427/208.8; 427/264; 427/265; 427/270; 427/271; 427/322; 427/327; 427/371; 427/385.5; 427/409; 427/411; 427/412; 427/435
[58] Field of Search ............... 427/207.1, 181, 203, 427/407.1, 208.6, 208.8, 264, 265, 270, 271, 322, 327, 371, 385.5, 409, 411, 412, 435

[56] References Cited

U.S. PATENT DOCUMENTS

| | | | |
|---|---|---|---|
| Re. 24,906 | 12/1960 | Ulrich | 206/59 |
| 2,652,351 | 9/1953 | Gerhardt | 154/53.5 |
| 3,299,010 | 1/1967 | Samour | 260/78 |
| 3,301,741 | 1/1967 | Henrickson et al. | 161/119 |
| 3,314,838 | 4/1967 | Erwin | 156/71 |
| 3,331,279 | 7/1967 | Aldrin et al. | 89/1.802 |
| 3,554,835 | 1/1971 | Morgan | 156/234 |
| 3,691,140 | 9/1972 | Silver | 260/78.5 |
| 3,701,758 | 10/1972 | Maska | 260/78.5 R |
| 3,740,466 | 6/1973 | Sanderson et al. | 260/29.6 |
| 3,770,708 | 11/1973 | Knoepfel et al. | 260/80.73 |
| 3,922,464 | 11/1975 | Silver et al. | 428/355 |
| 3,931,087 | 1/1976 | Baatz et al. | 428/474 |
| 4,012,560 | 3/1977 | Baatz et al. | 428/474 |
| 4,023,570 | 5/1977 | Chimal et al. | 128/290 R |
| 4,054,697 | 10/1977 | Reed et al. | 428/40 |
| 4,077,926 | 3/1978 | Sanderson et al. | 260/29.6 |
| 4,151,319 | 4/1979 | Sackoff et al. | 428/40 |
| 4,166,152 | 8/1979 | Baker et al. | 428/522 |
| 4,374,883 | 2/1983 | Winslow | 428/40 |
| 4,376,151 | 3/1983 | Parrotta | 428/323 |
| 4,387,172 | 6/1983 | Agarwal et al. | 524/60 |
| 4,418,120 | 11/1983 | Kealy et al. | 428/343 |
| 4,556,595 | 12/1985 | Ochi | 428/143 |
| 4,629,663 | 12/1986 | Brown et al. | 428/343 |
| 4,735,837 | 4/1988 | Miyasaka et al. | 428/40 |
| 5,087,494 | 2/1992 | Calhoun et al. | 428/40 |
| 5,141,790 | 9/1992 | Calhoun et al. | 428/40 |

FOREIGN PATENT DOCUMENTS

| | | |
|---|---|---|
| 0257984A3 | 3/1988 | European Pat. Off. |
| 0279579A1 | 8/1988 | European Pat. Off. |
| 0429269A1 | 5/1991 | European Pat. Off. |
| 053417746A1 | 11/1985 | Germany |
| 1514311 | 2/1979 | United Kingdom |
| WO91/13752 | 3/1990 | WIPO |

OTHER PUBLICATIONS

"Handbook of Pressure Sensitive Adhesive Technology", 2nd Ed., Donatas Satas, (1989) (no month available).
"Adhesion and Adhesives", vol. 1, 2nd Ed., R. Houwink and G. Salomon, Jan. 1965.
"Treatise On Adhesion and Adhesive", vol. 2: Materials, Robert L. Patrick (1969) (no month available).
"Principles of Polymerization", 3rd Ed., George Odian, Jul. 1992, pp. iii–vxii.

*Primary Examiner*—Bernard Pianalto
*Attorney, Agent, or Firm*—Gary L. Griswold; Walter N. Kirn; Carolyn V. Peters

[57] ABSTRACT

Method of preparing an adhesive sheet comprising (1) a backing, and (2) an adhesive layer having at least one topologically microstructured surface comprising a plurality of pegs, optionally containing one or more beads, substantially uniformly distributed and protruding outwardly from the adhesive layer, wherein the pegs have essentially flat tops that comprise less than 25% of the total surface contact area of the adhesive layer, and have a height of at least 15 μm.

5 Claims, 4 Drawing Sheets

METHOD OF PREPARING AN ADHESIVE ARTICLE

This is a division of application Ser. No. 07/959,456 filed Oct. 9, 1992, U.S. Pat. No. 5,296,277.

TECHNICAL FIELD

The invention relates to adhesive articles having positionable and repositionable bonding properties and in particular to adhesive articles having at least one microstructured adhesive surface.

BACKGROUND OF THE INVENTION

Pressure sensitive adhesive (PSA) sheets, rims and tapes are often difficult to apply to a substrate in a precise location and without air entrapment, primarily due to preadhesion or "quick stick" behavior of the PSA. This is particularly true for *aggressive" PSAs that have high bond strengths and/or low temperature tack properties. Several methods and configurations have been developed to make application of PSA films and tapes easier.

For example, application aids such as detergent and water are commonly used to eliminate preadhesion. Formulations vary, but typically include water, a surfactant or lubricant, and a solvent (generally an alcohol) that speeds bond formation and drying. The liquids tend to form a film between the adhesive and substrate, thus preventing contact and preadhesion. Unfortunately, the liquid is difficult to remove and removal of the liquid is seldom complete. Additionally, most application aids affect the adhesive properties and prevent rapid formation of a strong bond between adhesive and substrate. The application aids may also mar or stain substrate surfaces.

Dry application aids, such as particles, powders or talcs are also useful in preventing preadhesion (See, e.g., U.S. Pat. Nos. 4,376,151 and 4,556,595). While these techniques make application very easy and provide for easy positioning and repositioning, formation of a strong adhesive bond to the substrate is slow, typically requiting contact of 1 to 7 days.

Discontinuous coatings of nontacky materials projecting from the adhesive surface have also been used to prevent preadhesion of the PSA during application. Although these articles can be placed against a substrate and freely moved over the substrate surface, the articles lack any means for weakly and temporarily bonding the adhesive to the substrate prior to permanently bonding the article to the substrate. These adhesive films and tapes have no adhesion when placed lightly against the substrate surface. Such coatings include patterned polymer coatings, particles, and films (See, e.g., U.S. Pat. Nos. 3,554,835; 4,023,570; 4,054,697; 4,151,319; and U.K. Patent No. 1,541,311).

CONTROLTAC brand adhesives use a random distribution of hollow glass microspheres partially embedded in the adhesive as a means to prevent contact and preadhesion (See U.S. Pat. No. 3,331,279). Alternatively, U.S. Pat. No. 3,314,838 describes a similar configuration in which the tops of the hollow microspheres protruding from the adhesive surface are coated by a thin layer of PSA. Pressure application crushes the microspheres permitting the adhesive to contact the substrate and form a strong bond instantly.

Other methods of dealing with preadhesion include formation of brittle plastic projections on a PSA surface (See U.S. Pat. No. 3,301,741), or small discrete clumps of particles protruding from the adhesive surface (See EPO 0 429 269 A1). In the last example, the particles could be tacky adhesive microspheres, thus providing weak bonding to a substrate when applied using light pressure and strong bonding when applied using higher pressures. However, this multi-adhesive construction is generally more difficult to prepare.

Microsphere and patterned adhesives have also been reported that exhibit repositionable properties (See U.S. Pat. Nos. 3,69 1,140 and 4,166,152). Deformable microspheres, such as described in U.S. Pat. No. 4,735,837 impart a rough or pebble-like surface and repositionable bond. In all these cases, the adhesive films readily form weak, repositionable bonds to a substrate, but do not form a strong, permanent bond.

Topologically structured adhesives have also been described. For example, relatively large scale embossing of an adhesive has been described to permanently reduce the PSA/substrate contact area and hence the bonding strength of the PSA (See EPO 0 279 579). Various adhesive layer topologies include concave and convex v-grooves or hemispheres, and other three dimensional shapes. In general, these topologies provide adhesive sheets, films and tapes with lower peel adhesion values in comparison with smooth surfaced adhesives. In many cases, the topologically structured adhesives also display a change in adhesion with increasing contact time.

The adhesive articles described herein above exhibit various types of positionable and repositionable behavior. Particles added to or applied over an adhesive to change its surface properties tend to alter the bulk adhesive properties. The articles generally suffer from problems of poor release liner attachment, poor aging, handling and bonding characteristics. In sign graphic applications, they tend to be difficult to print without destroying the positionable behavior of the construction. Furthermore, when adhesive articles are prepared using clear rims and applied to clear substrates, particles (when pressed against the substrate) are large enough to be seen and result in visual imperfection, particularly, in backlit sign graphic applications.

SUMMARY OF THE INVENTION

Briefly, in one aspect of the present invention an adhesive sheet is provided, having a backing and at least one topologically microstructuredadhesive surface. The microstructured adhesive surface comprises a uniform distribution of adhesive pegs over the functional portion of an adhesive surface and protruding outward from the adhesive surface. The adhesive-only pegs typically comprise the same adhesive material as the underlying adhesive layer. The pegs have essentially flat tops that generally have a contact area of 1–25% of the total adhesive area. The pegs have an average height of at least 15 $\mu$m. A feature of the microstructured adhesive surface permits weak adherence of the sheet to a substrate, thus affording easy repositionability and in specific instances, positionability.

Advantageously, the microstructured adhesive surface also makes it possible to apply an adhesive sheet, such that a strong, permanent bond to the substrate is quickly established. The strength of the adhesive bond is controlled by the application pressure used to mount the adhesive sheet to the substrate.

In another aspect of the present invention, the pegs are a composite of adhesive and one or more beads, with the bead being substantially covered by adhesive. Preferably, the pegs are a composite of adhesive and a plurality of beads. Advantageously, the pegs and the bonding behavior of the adhesive are stable to aging. The beads can be organic or inorganic particles, including but not limited to polymers, glass, ceramics, adhesive beads, or metals. The beads do not have to completely fill the pegs or be present in all of the pegs.

In another aspect, the composite pegs provide improved optical properties of the adhesive sheet, particularly when used in backlit situations, such as sign fascia. The beads in the composite pegs are selected so as to closely match the refractive index of the adhesive. Such matching of the refractive index of the beads with the adhesive results in improved transparency and reduced haze of an applied backlit sign or window marking film.

In yet another aspect, the topologically microstructured surface comprises a uniform distribution of adhesive-only and composite pegs. Any construction contemplated using the adhesive-only pegs or the composite pegs are suitable for use with a mixture of pegs, that is the adhesive-only and composite pegs.

Advantageously, adhesive articles of the present invention, when provided with a protective liner, are sufficiently durable to withstand the rigors of various printing and convening operations, such as cutting, coating, drying, and lamination. The adhesive article is positionable or repositionable, yet exhibits cling adhesion, depending on the particular adhesive and topological microstructure chosen, that is, composite pegs or adhesive-only pegs. As a result, the adhesive articles can be easily and cleanly applied to a variety of surfaces, including corrugation and rivets typical of commercial vehicles.

In this application:

"adhesive" refers to the adhesive composition, and may also refer to the adhesive layer of an adhesive article;

"bead" refers to particles that may be spherical, cubic, irregularly shaped, solid, porous, hollow, elastic, inelastic, adhesive or nonadhesive;

"film" means a thin, flexible plastic sheet and is also referred to as a backing or carrier web;

"pegs" when used alone encompasses adhesive-only pegs, composite pegs, or combinations thereof;

"positionable" means an adhesive or pressure sensitive adhesive surface can be placed against a substrate surface and easily slid over the surface into proper position without preadhering to the substrate; pressure is generally required to adhere the adhesive article to the substrate;

"removable" means an adhesive or pressure sensitive adhesive surface can be adhered to a substrate surface and the adhesive and backing can be simultaneously removed from a substrate without ply failure, "two-bond* failure, adhesive transfer, or backing disintegration;

"repositionable" means an adhesive or pressure sensitive adhesive surface can be applied and adhered to a substrate and then removed (generally within 24 hours) and reapplied without distorting, defacing, or destroying the backing, adhesive, or substrate; repositionable adhesives need not be positionable or vice versa;

"sheet" means thin, large surface area articles which can be rectangular shapes or in other configurations such as alphanumeric characters; the latter can be individually repositionable or, when releasably supported by a carrier in a desired pattern, collectively repositionable, furthermore the adhesive articles can be marketed in long rolls or in individual sheets;

"substantially uniformly distributed" means the unit avenge density of pegs on the functional portion of the adhesive surface is uniform over the whole adhesive surface in a regular or random pattern as is necessary to make that adhesive surface positionable and/or repositionable;

"substrate" means the surface upon which an adhesive article is applied; and

"tack*" means instant contact adhesion between the adhesive and the substrate, and the tack may be substrate specific.

BRIEF DESCRIPTION OF THE DRAWING

In the drawing, each figure of which is schematic.

DESCRIPTION OF THE PREFERRED EMBODIMENT(S)

The present invention is an adhesive sheet having at least one topologically microstructured adhesive surface and a backing. The microstructured adhesive surface comprises a uniform distribution of adhesive pegs, protruding outward from the adhesive surface. The pegs generally comprise the same adhesive material as the underlying adhesive layer. The pegs have essentially flat tops that generally have a contact area of 1–25% of the total adhesive area. The pegs have an average height of at least 15 $\mu$m. The microstructured adhesive surface permits weak adherence of the sheet to a substrate, thus permitting easy repositioning as needed.

Advantageously, the microstructured adhesive surface also makes it possible to apply the sheet, such that a strong, permanent bond to the substrate is quickly established. The pegs provide repositionable adhesion with a light pressing on the adhesive sheet. Stronger adhesion can be made by compressing the pegs and contacting the underlying adhesive layer to the substrate. Advantageously, the microstructured adhesive surface of the present invention does not affect the aging characteristics of the adhesive or the backing, nor does it den-act from the fully developed permanent bond.

Figure 3:
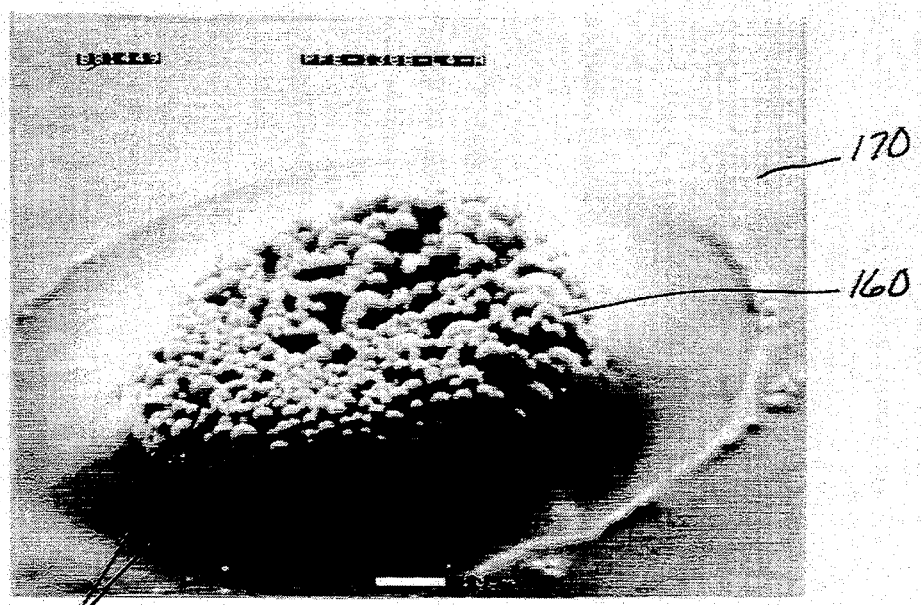
FIG. 3 is an electron micrograph taken with a SEM of a particle clump illustrating an embodiment of the prior art.
Figure 4:
FIG. 4 is an electron micrograph enlargement taken with a SEM of the surface of the particle clump illustrated in FIG. 3.
Figure 5:
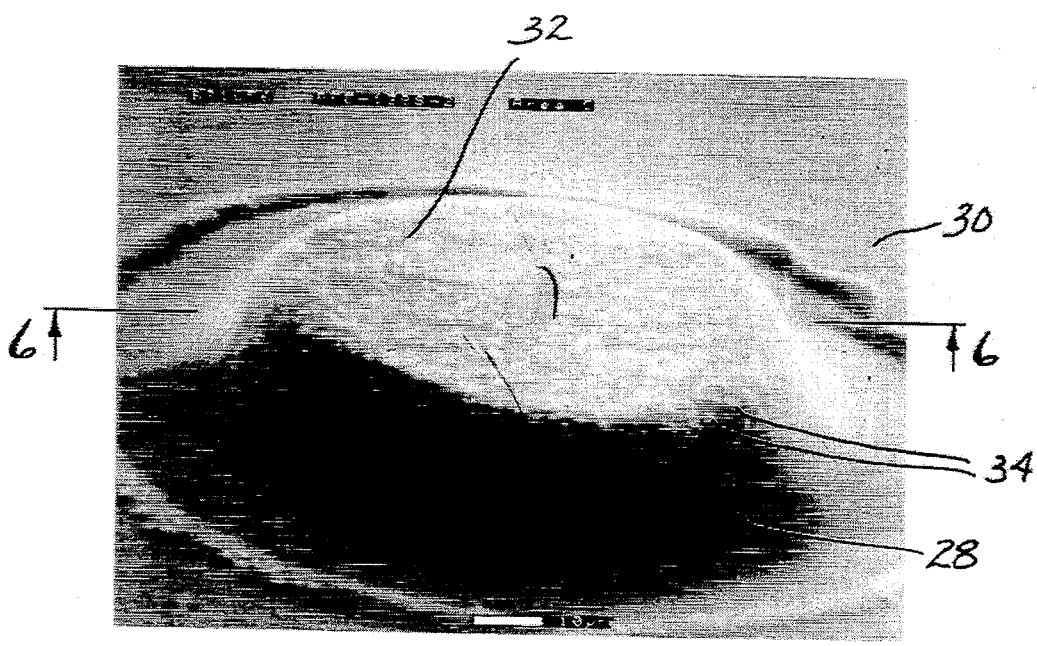
FIG. 5 is an electron micrograph taken with a SEM of a single composite peg of the present invention comprising adhesive and beads.

Several embodiments of the present invention can be Illustrated by reference to FIGS. 1–2 and 5–8. In contrast to the present invention, a prior art particle clump is illustrated in FIGS. 3 and 4.

Figure 1:
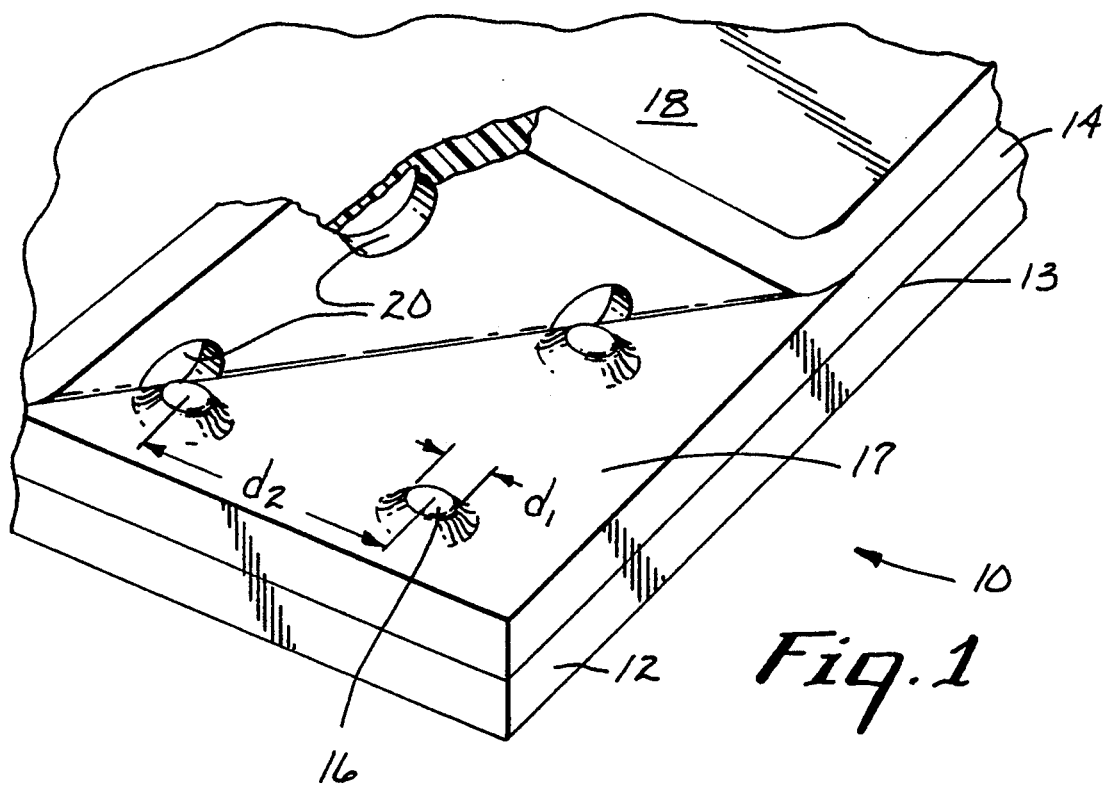
FIG. 1 is a planar cross section schematic of an adhesive article of the present invention.
Figure 2:
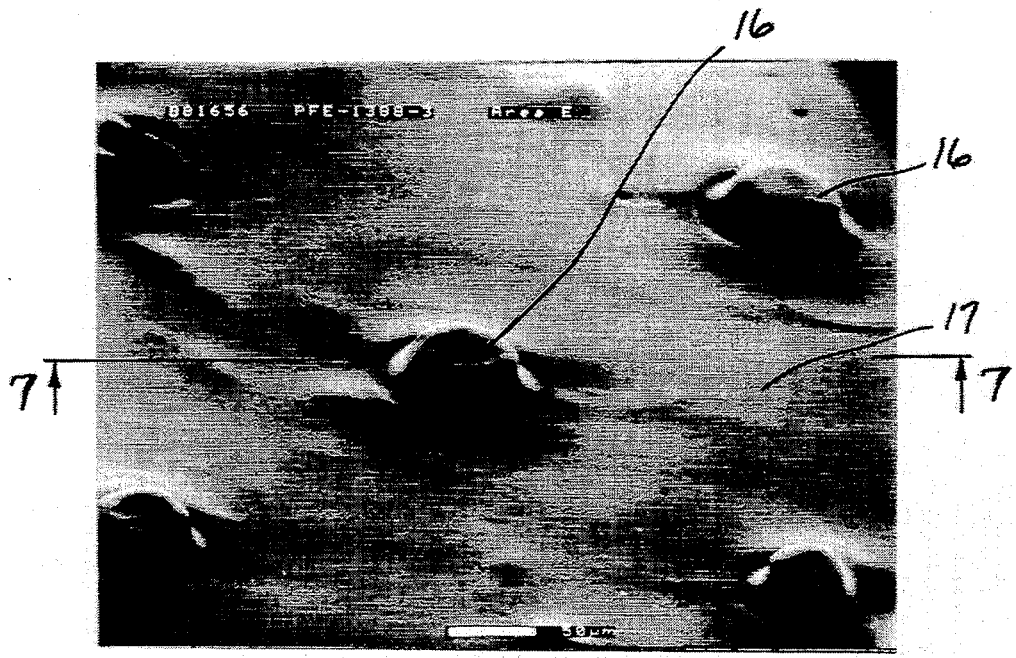
FIG. 2 is an electron micrograph taken with a scanning electron microscope (SEM) and is a planar view of adhesive pegs of the present invention arranged in a regular pattern over an adhesive layer.

Referring to FIGS. 1 and 2, an adhesive sheet 10 is illustrated comprising a backing 12, attached to an adhesive layer 14, wherein adhesive layer 14 comprises uniformly spaced topologically microstructured pegs 16 protruding above adhesive layer surface 17. Adhesive layer 14 is further overlaid with a liner 18. Liner 18 comprises uniformly spaced depressions 20. Typically, during fabrication of adhesive sheet 10, adhesive layer 14 is coated onto liner 18, wherein the adhesive mixture is allowed to flow into peg depressions 20. Backing 12 is then laminated to the planar surface 13 of adhesive layer 14. Although backing 12 is illustrated as a single ply, backing 12 can be comprised of multiple plies of thermoplastic materials, additional adhesive layers, primer layers, protective coatings, barrier layers, and any other structures and combination of structures known to those skilled in the art, such as sign sheeting, transfer or release liners, transfer tapes, adhesive-coated film foams, woven and non-woven sheets, paper, and metal foils. When backing 12 is a liner, suitable liners are the same as identified for liner 18 (below).

Although FIG. 1 illustrates pegs 16 as protruding outward from adhesive layer surface 17, that is opposite to backing 12, it is contemplated that pegs 16 could protrude our, yard from the adhesive surface towards interface 13, that is into backing 12. Such a construction is useful as a transfer tape of adhesive. Additionally, adhesive surface 17 may be microstructured, that is comprise a plurality of pegs 16, in addition to interface 13 being microstructured.

For most uses, adhesive layer 14 of the adhesive sheet 10 should be at least 25 $\mu m$ in thickness in order to conform to irregularities in substrates to which it may be applied.

Referring again to FIGS. 1 and 2, pegs 16 may be substantially uniformly distributed on the functional portion of adhesive layer surface 17, for example, along only one edge of a wide sheet or tape of the invention to allow precise repositioning of that edge, after which the rest of the sheet inherently falls into place and hence needs no adhesive. It is also within the scope of the present invention to have a peg-density gradient from top to bottom, side to side, convergent or divergent to the center of the adhesive article, etc.

Figure 7:
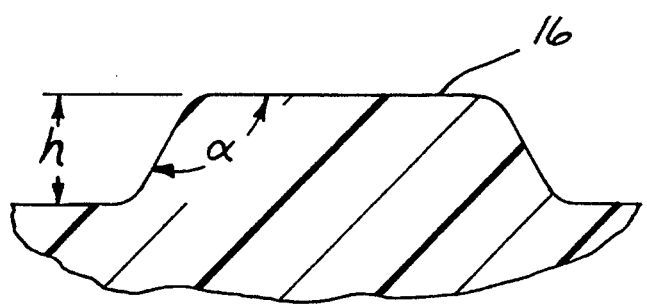
FIG. 7 is a cross section of an adhesive peg illustrated in FIG. 2 at 7—7.

Adhesive pegs 16 can be shaped such that the cross section of a peg taken in a plane parallel to the adhesive layer may be oval, circular, polygonal, rectangular, star-shaped, annular, irregular, and any combination thereof. Referring to FIG. 7, pegs 16 have essentially flat tops, preferably less than 5 $\mu m$ average surface irregularity. The inside angle ($\alpha$) between the top and the sides of a peg is preferably no greater than 150°, more preferably between 80° and 135°. The angle between the base of the peg 16 and the adhesive surface 17 is not as critical as the upper inside angle and can be radiused.

The average height of an array of pegs over the adhesive surface should be at least 15 $\mu m$. The pegs generally have a maximum height of 200 $\mu m$, preferably 150 $\mu m$, and more preferably 50$\mu$. The height may vary, but the height variation is preferably random, that is, it is undesirable to have a number of shorter pegs grouped together. In addition, the average height (h) of adhesive peg 16 is approximately 15 $\mu m$, thus taking into account height variations within the individual peg. However, the height (h) and the inside angle ($\alpha$) is, in pan, a function of the adhesive composition selected for use in practicing the present invention. Preferably, peg heights are uniform, however, it is within the scope of the present invention to have a plurality of pegs having fabrication height variances. It is also within the scope of the invention to have a plurality of pegs having a predetermined height variance, advantageously further controlling positionability and/or repositionability. For example, an array of pegs could have heights of 15 $\mu m$ and 25 $\mu m$ providing three levels of adhesion, light pressure to contact the 25 $\mu m$ pegs, more pressure to contact 15 $\mu m$, and then full pressure to provide the permanent adhesive bond provided by the adhesive surface.

When the pegs are too short, the pegs tend to collapse at the peel front, thereby initiating a stronger, permanent bond. It is useful to note, the height (h) and inside angle ($\alpha$) considerations are less stringent for composite pegs 28 (described below in reference to FIGS. 5–7) than for the adhesive-only pegs. However, for convenience and economy of resources, the same configured liner could be useful for composite pegs 28, as well as the adhesive pegs 16. Beads 34 in the composite pegs 28 have a tendency to reduce the criticality of the height and angle of the composite pegs 28.

With reference to FIGS. 5–8, an adhesive sheet has a topologically microstructured adhesive surface and a backing (not shown), wherein the microstructured adhesive surface comprises a uniform distribution of composite pegs 28, protruding from the adhesive surface 30. Pegs 28 are a composite of adhesive and beads 34, with beads 34 being substantially covered by adhesive. While it is preferred beads 34 be completely covered or encompassed by the adhesive, it is within the scope of the present invention that a small portion of the beads may be above or below the surface and not covered by the adhesive, provided the overall surface of the peg provides an adhesive surface. Advantageously, composite pegs 28 of the present invention provide an adhesive surface that is both positionable and repositionable.

Figure 6:
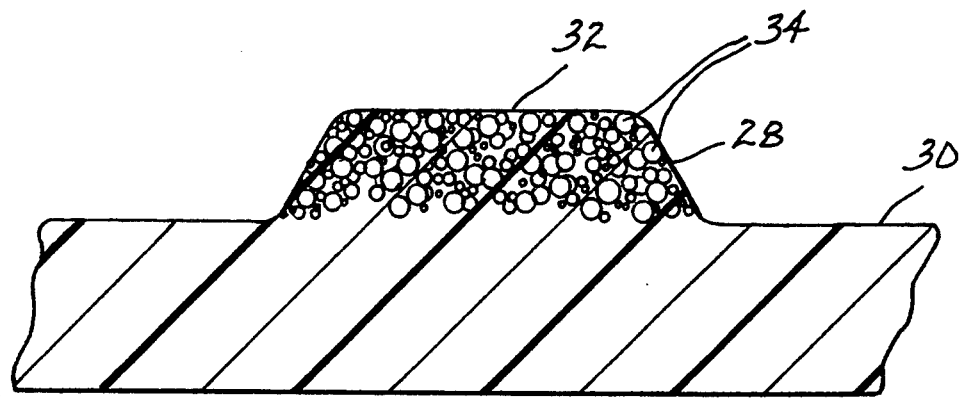
FIG. 6 is a cross section of the composite peg illustrated in FIG. 5 at 6—6.
Figure 8:
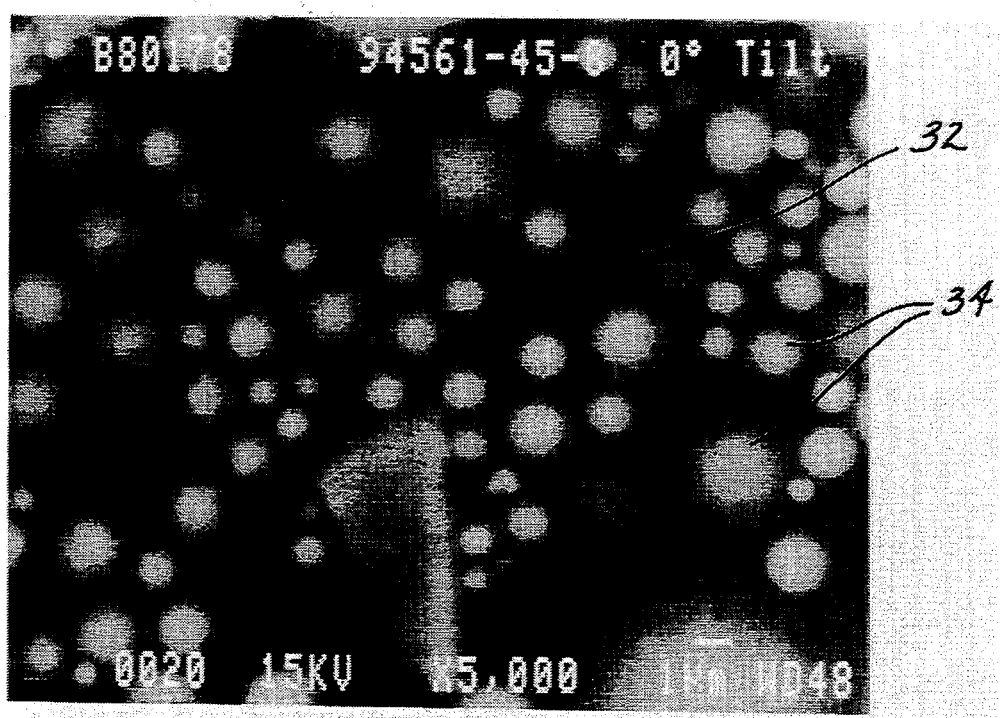
FIG. 8 is an electron micrograph enlargement taken with a SEM of the surface of the composite peg illustrated in FIG. 5.

Referring specifically to FIGS. 6 and 8, beads 34 are encompassed within peg 28. This is schematically illustrated in FIG. 6. Although FIG. 6 illustrates peg 28 as being filled with beads 34, it is also possible to have pegs that are only partially filled with beads. As further illustrated in FIG. 8, beads 34 appear as muted shapes (because the beads are covered with adhesive) in the adhesive surface 32, in sharp contrast to the clear, focussed shapes (the beads are not covered with adhesive) illustrated in FIG. 4 (prior art).

In contrast and referring to FIGS. 3 and 4, a particle clump as described in EPO 0 429 269 A1 is illustrated. A particle clump 160 protrudes from an adhesive surface 170. Particle clump 160 is comprised of adhesive and a plurality of beads 150. Beads 150 form a non-tacky surface on the particle clump 160.

When the adhesive sheet of the present invention is used for decorative purposes, the beads preferably are substantially smaller than the thickness of the adhesive layer so that after being pressed into the adhesive layer, the beads do not mar the exposed face of the backing. For example, when the adhesive layer is approximately 20–40 $\mu m$ thick, each of the beads is preferably less than 20 $\mu m$ in average diameter, preferably from 1 to 15 $\mu m$ in average diameter, and more preferably from 1 to 10 $\mu m$ in average diameter. Note, the beads are typically a mixture of sizes. Beads smaller than approximately 0.5 $\mu m$ may be more difficult and expensive to use than larger particles. In nondecorative uses such as masking tape, the beads can exceed the thickness of the adhesive. It is also possible to prepare composite pegs, by first coating an embossed liner with a latex resin to partially fill the depressions, wiping the surface of the liner and allowing to resin to dry or coalesce. The dried or coalesced resin is then overcoated with an adhesive solution. Such a procedure forms the "beads" in situ.

Typically, the pegs can be formed by direct coating an adhesive onto a microstructured liner. In the case of composite pegs, the pegs can be formed by direct coating of adhesive onto a microstructured liner, in which small depressions have been previously filled with beads and optionally, a functionally sufficient amount of polymeric binder. Alternatively, the composite pegs can be formed with a first pass coating of an adhesive/bead slurry, followed by an adhesive only coating. The second, adhesive only coating could be a chemically different adhesive provided the second adhesive is sufficiently compatible with the first pass coating adhesive. This is generally necessary to keep the pegs on the adhesive (second coat, g) surface after the liner is removed during application.

A method for preparing the adhesive articles comprising composite pegs, comprises the steps: (a) preparing a slurry of beads; (b) coating the slurry onto an embossed liner to fill depressions in the embossed liner; (c) wiping the embossed liner to remove excess slurry; and (d) coating the filled embossed liner with an adhesive solution and; (e) allowing the adhesive solution to adsorb into and around the beads before drying. The adhesive solution can be a latex adhesive solution or a solution containing reactive monomers, that is polymerizable monomers as a diluent.

A preferred liner for an adhesive article of the invention is a low adhesion surfaced polymeric plastic film. The liners can be protective liners, release liners, and the like. When the adhesive article is made by the first of the above-outlined methods, the plastic film can be embossed to form the depressions. The embossable plastic film can be self-supporting, but a preferred liner is kraft paper, one or more surfaces of which has a thin, embossable polyethylene coating that is covered by a silicone release coating. Useful self-supporting plastic films include but are not limited to plasticized poly(vinyl chloride) and biaxially oriented poly(ethylene terephthalate) and polypropylene, all of which are economical and have good strength, toughness, and dimensional stability. Preferably, depression shapes within the embossed liner are typically a truncated cone having an essentially flat bottom.

Nonlimiting examples of backings useful for the present invention may be thin or thick plastic (synthetic or natural), reflective sheeting, fabrics (woven or nonwoven), papers, metal foils, composite release liners and the like. The backing may be constructed such that the resulting article is a graphic article, a transfer tape, a double-sided tape, an awning, and the like. Furthermore, the backing may include additional functional and decorative layers, such as clear coats, decorative graphics, dirt and weather resistant coatings, art known adhesive layers, screen printable inks, barrier layers, adhesion promoters, multilayers of translucent films and the like. Such functional and decorative layers are known in the art and may be used, applied or laminated according to techniques known to those skilled in the art.

Specific but nonlimiting examples of adhesive articles comprising at least one topologically microstructured surface include (1) in sequence, an embossed liner, a microstructured adhesive surface, and a flexible thermoplastic backing, (2) in sequence, an embossed liner, a microstructured adhesive layer, a thermoplastic layer, a microstructured adhesive layer, and an embossed liner; (3) in sequence, an embossed liner, a double-sided microstructured adhesive layer, an embossed liner; (4) in sequence, an embossed liner, a microstructured adhesive layer, a thermoplastic layer, an art known adhesive layer, a poly(vinyl)chloride film, an art known adhesive layer, and a clear coat layer; and (5) in sequence, an embossed liner, a microstructured adhesive layer, an adhesion promoter, a microstructured adhesive layer, an embossed liner. While several examples are cited to illustrate various multi-layered constructions of articles, any adhesive article having at least one microstructured adhesive surface is within the scope of the present invention. In cases where more than one microstructured adhesive layer is used, the adhesive systems for the layers need not be the same.

The spacing between adjacent pegs formed from the depressions in the liner may affect the adhesive or positionable properties of the adhesive sheet. Preferably, the spacing of the pegs is such that the contact surface of the adhesive-only, flat-topped pegs comprises 1-25 % of the total surface area, more preferably the contact surface of the pegs comprise 1-10% of the total surface area of the adhesive layer. Spacing between adjacent pegs can be dependent on factors such as the height, diameter, shape of the pegs, composition of the adhesive, and stiffness of the backing of the adhesive article. Further, the spacing between the pegs, that is, the planar adhesive surface contiguous with the base of the pegs and between the pegs is greater than 30% of the total adhesive layer. For example, (referring to FIG. 1) good repositioning of the adhesive surface has generally been attained when the spacing between centers (d2) of adjacent pegs 16 has been within the range of 0.1 to 0.5 mm (preferably from 0.2 to 0.4 ram) and is greater than the diameter (d1) of pegs 16. A spacing of substantially less than 0.1 mm (in this instance) might result in contact surface area of the pegs covering more than 25% of the adhesive surface and reduced bonding strengths. The composite pegs, where the shape and size are not as critical as for adhesive-only pegs, the total contact area is generally 25% or less of the total adhesive surface.

The adhesive sheet may employ any an known pressure-sensitive adhesives, preferably one that is aggressively tacky and forms strong bonds on contact with substrates such as signboards. The adhesive composition is preferably a pressure-sensitive adhesive. The benefit of a pressure-sensitive adhesive is its natural flexibility and elongation properties. As a class, these types of adhesives tend to perform well in the practice of the present invention.

Pressure-sensitive adhesives are an recognized as a standard class of materials. These are adhesives, which in dry (substantially solvent free except for residual solvent) form are aggressively and permanently tacky at room temperature (e.g., 15° to 25° C.) and firmly adhere to a variety of dissimilar surfaces upon mere contact without the need for more than manual pressure. The adhesives require no activation by water, solvent or heat in order to exert a strong adhesive holding force towards such materials as paper, cellophane, glass, plastic, wood and metals. The adhesives have a sufficiently cohesive holding and elastic nature such that, despite their aggressive tackiness, they can be handled with the fingers and removed from smooth surfaces without leaving a substantial residue (of. Test Methods for Pressure-Sensitive Tapes, 6th Ed., Pressure Sensitive Tape Council, 1953). Pressure-sensitive adhesives and tapes are well known, and the wide range and balance of properties desired in such adhesives has been well analyzed (of. U.S. Pat. No. 4,374,883; and "Pressure-Sensitive Adhesives" in *Treatise on Adhesion and Adhesives* Vol. 2, "Materials," R.I. Patrick, Ed., Marcel Dekker, Inc., N.Y., 1969). The various materials and compositions useful as pressure-sensitive adhesives are available commercially and are thoroughly discussed in the literature (e.g., Houwink and Salomon, *Adhesion and Adhesives*, Elsevier Publ. Co., Amsterdam, Netherlands, 1967; Handbook of Pressure-Sensitive Adhesive Technology, Donates Satas, Ed., VanNostrand Reinhold Co., N.Y., 1982).

Pressure-sensitive adhesives are generally chemically composed of rubber-resin materials, acrylic resins, polyurethane resins, silicone resins, and the like. Amongst the various patent literature describing compositions and improvements in pressure-sensitive adhesive formulations are U.S. Pat. Nos. RE24,906; 2,652,351; 3,740,366; 3,299,010; 3,770,708; 3,701,758; 3,922,464; 3,931,087; 4,012,560; 4,077,926; 4,387,172; 4,418,120; 4,629,663; and the like. These classes of rubber resin, acrylic, silicone, and polyurethane pressure-sensitive adhesives as well as any other pressure-sensitive adhesives are generally useful in the present invention. Preferred classes of low tack pressure-sensitive adhesives are particularly described in U.S. patent applications Ser. Nos. 07/513,679 (filed Apr. 24, 1990) and 07/513,680 (filed Apr. 24, 1990) and such description is incorporated herein by reference.

Non-pressure-sensitive adhesives, thermally-activated or solvent-activated adhesives may be used if they can display required elastic elongation properties (i.e., at least 120%). They are, however, less preferred embodiments than pressure-sensitive adhesives because of their more difficult application and greater tendency to entrap air during application.

The adhesive may be substantially nontacky at room temperature if it becomes tacky at an elevated temperature at which it is to be used. Alternatively, the adhesive may be nontacky to the touch but aggressively tacky to other substrates. These adhesives are substrate specific and provides an appropriate adhesive bond between the substrate and the adhesive sheet.

Where thicker pressure-sensitive adhesive coatings are desired, it may be desirable either to apply multiple layers of the adhesive or to photopolymerize an adhesive in situ. For example, mixtures of monomeric alkyl acrylates, copolymerizable monomers, such as acrylic acid and optionally, polymers can be copolymerized by exposure to ultraviolet radiation to a pressure-sensitive adhesive state.

The adhesive article is useful for a variety of applications, such nonlimiting examples include decorative and informative markings on vehicles; signage; buildings; fascia; awnings; tapes, such as, transfer tapes, double-sided tapes, photographic and other layout tapes; masking for paint spraying; wallpaper; and the like.

Objects and advantages of this invention are further illustrated by the following examples, but the particular materials and mounts thereof recited in these examples, as well as other conditions and details, should not be construed to unduly limit this invention. All materials am commercially available except where stated or otherwise made apparent.

EXAMPLES

The adhesive resins used to prepare the adhesive solutions 1–3 and 5 contained acrylic copolymers that were prepared by free radical polymerization of isooctylacrylate and acrylic acid according to free radical polymerization techniques known to those skilled in the art, such as described in Odian, *Principles of Polymerization*, 3rd ed. John Wiley and Sons, New York, 1991. In the following examples, all parts are given by weight. Each of the adhesive solutions 1, 2 and 5 were coated within 24 hours of preparation.

The 180° peel back data provide a comparison of adhesive strength and ease of removal at 22° C. The slide rating data for ease of sliding and repositioning provided a comparison of contact adhesion and ease of positioning and repositioning at 40° to 43° C. The % wet out area data provided a comparison for the amount of static contact between the adhesive layer and a substrate under the given application conditions.

Adhesive solution 1

Isooctylacrylate-acrylic acid (93:7) copolymer (100 parts) and 1,1'-(1,3-phenylenedicarbonyl) his (2-methylaziridine), (0.01 pans, herein after referred to as "bis amide") crosslinker were combined in ethyl acetate at a solids content of 10-25 %.

Adhesive solution 2

Isooctylacrylate-acrylic acid (90: 10) copolymer (100 parts) and bis amide (0.02 parts) crosslinker were combined in ethyl acetate at a solids content of 1045 %.

Adhesive solution 3

Isooctylacrylate-acrylic acid 05.5:4.5) copolymer (73 parts), NEWPORT S resin (17 parts and available from Arizona Chemical Co.) and UNITAC 72M70 resin (10 parts and available from Union Camp Corp.) were combined in isopropanol and heptane at a solids content of 25–30%.

Adhesive solution 4

A partially polymerized mixture of isooctylacrylate (90 pans) and acrylic acid (10 parts) was blended with Irgacure 651 (0.1 pain, 2,2-dimethoxy-2-phenylacetophenone from Ciba Geigy) and XL-353 (0.2 pans, 2,4-bis(trichloromethyl)-6-(3,4-dimethoxyphenyl)-l,3,5-triazine from 3M), as described in U.S. Pat. No. 4,330,590, Examples 1, and 5–7, and such descriptions are incorporated herein by reference.

Adhesive solution 5

Isooctylacrylate-acrylic acid (93:7) copolymer (100 parts) and bis amide (0.04 parts) crosslinker were combined in ethyl acetate at a solids content of 40–45%.

Embossed release liners

Release liners used in the Examples were polyethylene coated papers with commercial silicone release coatings. Embossed release liners were prepared by thermal embossing such as described in U.S. Pat. No. 3,301,741, and such description is incorporated herein by reference. The surface area covered by the embossed depressions for examples 1–4, 5–12, 13–15, 20–40, C3, C11 and C12 varied from 2 to 11%, with most samples between 3 and 6%. The liners for Examples 16–19 have larger surface areas covered by the embossed depressions.

In the following Table, depressions/in² is convened to the corresponding peg density of lines per inch (lpi).

TABLE I

| Depressions/in² | Lines per inch (lpi) |
|---|---|
| 1250 | 35 |
| 1600 | 40 |
| 2500 | 50 |
| 4225 | 65 |
| 7225 | 85 |

Preparation of particle filled, embossed release liners

The depressions in the embossed release liners were selectively filled with beads or particles by applying an excess coating of beads to the liner (dry or preferably dispersed in a liquid) then wiping off the excess coating with a rubber, plastic or metal blade, such as described in EPO 0 429 269 A1.

Backings

The backing used to prepare the Examples was either a 60 μm thick plasticized, white vinyl film identical to that used in 3M number180-10 films with CONTROL-TAC brand adhesive, or a clear 60 μm thick PET film identical to that used for 3M number 639 SCOTCH-CAL brand film.

Peel adhesion testing

Adhesion tests conducted were a modification of ASTM method D 3330 (1992) and Pressure Sensitive Tape Council method PSTC-1 (1989). Samples of microstructured adhesive and film on release liner were laminated with 3M SCOTCHCAL 3650 adhesive film as a backing. The backing film prevented the sample films and adhesive from excessively stretching during peel back testing. The samples were equilibrated in a constant temperature and humidity room at 22° C., 50% relative humidity for at least 24 hours prior to application. The backed tape samples were cut into 2.54 centimeter wide strips. DuPont "PrepSol was used to clean the surface of chromate treated aluminum test panels. The release liner was removed and the adhesive strips were applied to the aluminum panels using either a 180 gram or 2 kilogram roll down wheel at a speed of 2.54 centimeter/second (2 roll down passes per sample). Peel adhesion was measured about 5 minutes after application (unless otherwise stated) as a 180peel back at a crosshead speed of 30.5 cm/min using a Lloyd tensile tester. In several cases a peel adhesion value of "<0.01" kg/cm is reported. This value indicates that the peel force was finite but smaller than the measuring range of the peel tester and is referred to in the text as "*cling adhesion*".

Testing and rating ease Of sliding and repositioning

A horizontal glass plate or aluminum plate was heated to 40°–43° C. and cleaned with methylethylketone (MEK). A piece of the pressure-sensitive adhesive sheet to be tested, approximately 15 cm by 23 cm, was placed on the glass plate with the adhesive side up to warm for approximately 15 to 60 seconds. The sheet was removed and immediately laid adhesive side down on the heated plate and allowed to rest for at least 10 seconds. The edge of the sheet was lifted and the sheet pulled laterally. If it slid freely it was rated a "1". If the sheet slid with resistance, but could be easily lifted off the surface it was rated 2". If the sheet did not slide but could be lifted and repositioned without damage, it was rated a "3". If the sheet stuck to the plate and could not be repositioned without damage, it was rated a "4".

Wet out area measurement

Samples were applied to cleaned glass plates as described above in the section on peel adhesion testing. The glass slides were illuminated from the edges and the adhesive viewed from above using a video camera equipped with a macro lens (4810 Series solid-state CCD camera, Cohu, Inc., San Diego, CA). Where the adhesive contacts the glass, a bright image was observed, non-contact areas were dark. Images of approximately 1 square inch were sampled using a computer-based image capture and analysis system (JAVA software from Jandel Scientific and PCVision digifixing computer/video interface card). The contact or % wet out areas were calculated as the ratio of bright image/total image. Values reported for % wet out area are the mean values of 4 sampling locations. The standard deviations for these values are approximately 2 % of total area.

Samples were also prepared as above and adhesive wet out areas estimated from optical microscopy photos using the measured images from above for visual comparison. Reflective lighting was used and the glass to adhesive contact areas were darker. These estimated contact values are shown as "∼%" wet out in the data tables.

EXAMPLES 1–12 AND C1–C2

The examples 1–12 and C1–C2 showed that adhesive films having the microstructured adhesive surface comprised of adhesive pegs could be temporarily applied and easily repositioned until a more permanent bond was desired. The permanent bond was rapidly obtained by using more pressure to apply the adhesive film.

The examples were prepared according to the following general procedure. Adhesive solution I was coated onto a release liner embossed with a square array pattern of depressions (the dimensions and frequency are given in Table ID to provide an adhesive layer that had a dry thickness of 30–40 μm. 60 μm thick vinyl film was laminated to the adhesive layer on the liner to give a pressure sensitive adhesive film. The liner was removed and the adhesive surface examined under a microscope. Electron micrographs were used to verify the size and shape of the adhesive pegs. Each sample showed an adhesive surface that substantially replicated the surface of the release liner.

The peg density (in pegs per square cm) and avenge height, as well as peel adhesion and % wet out area for each Example are summarized in Table II. Examples 1–12 showed better repositionability when the pegs were >15 μm tall. Samples applied using a force of 2 kilograms gave peel back adhesion values of approximately the same strength as were obtained for samples having a smooth adhesive surface (see Examples C1 and C2). Although, it has been suggested in the art that reduction of the adhesive contact or wet out area would lead to substantially reduced adhesion and repositionable behavior, it was observed that the adhesive contact area was only one factor contributing to the effectiveness of the present invention. It was observed that samples of Examples 4, 7 and 12, (having 15 μm pegs) had wet out areas similar to samples of Examples 1-3, 5, 6, and 8-11 when applied using an application force of 180 grams, but these short peg samples had only slightly reduced adhesion values and were not easily repositionable.

Referring to Table II, please note the following variations from the general preparation and testing procedures:

Example 1: microscopic examination of the sample applied to a glass plate using a 180 gram force and partially peeled back showed that adhesive wet out of the glass at the peel front was not substantially changed;

Example 4: microscopic examination of the sample applied to a glass plate using a 180 gram force and partially peeled back showed that nearly complete adhesive wet out of the glass occurred at the peel front;

Example C1: the Liner used was not embossed but had a 1 μm avenge roughness;

Example C2: the liner used was not embossed but had a 3 μm avenge roughness; and Example 8: fully applied samples showed slight telegraphing of the adhesive pattern through the film.

EXAMPLES 13-19 AND C3-C5

Examples C3 and C4 illustrate how repositionable adhesive behavior was adversely affected by the shape of the pegs. Example 13 showed that heat aging or baking the adhesive on its protective liner did not adversely affect repositionable behavior. In contrast, Example 14 showed that heat aging of the crosslinked adhesive from Example C5 in contact with an embossed liner did not afford a repositionable adhesive film. Example 15 showed that bonding behavior did not significantly change with increased contact times at room temperature. When samples of Example 15 were applied using a 180 g roll down weight, nearly identical peel adhesion values and repositionable behavior were observed after 5 minutes and 24 hours of contact. When samples of Example 15 were applied using a 2 kg roll down weight, nearly identical peel adhesion values and permanent bonding were observed after 5 minutes and 24 hours of contact. Examples 16-19 showed the effect of larger pegs that cover more surface area. These Examples were also repositionable and quickly form a more permanent bond but a greater application force was generally required to obtain the stronger bond. The results are summarized in Table III.

EXAMPLE C3

Adhesive solution 1 was coated onto an embossed release liner (the dimensions and depression density are given in Table III), rapidly dried, and then laminated as described in Example 1. Microscopic inspection of the adhesive surface showed a pattern of partially formed adhesive pegs that proraided above a smooth adhesive surface. The adhesive pegs did not replicate the liner surface due to entrapment of air bubbles. The adhesive wet out area on glass (180 grams application force) was substantially less than in Example 2 yet nearly complete wet out was observed at the peel front as described in Example 4.

EXAMPLE C4

Adhesive solution 1 was coated onto a release liner removed from 3M 180-10 CONTROLTAC brand adhesive film, dried and laminated as described in Example 1. The liner had a randomly distributed pattern of hemispherical depressions an average of approximately 25 μm deep and 50 μm diameter, covering approximately 3% of the surface. Microscopic inspection of the adhesive surface showed a corresponding random pattern of hemispherical shaped adhesive projections protruding approximately 25 μm above a smooth adhesive surface. The adhesive projections substantially replicated the liner surface. The initial contact (no application force) wet out area on glass was low (~10-15%) and consisteft of small round spots. The wet out area increased to greater than 50% within 10 minutes after application (no additional application force was used).

EXAMPLES 13-19 AND C5

Examples 13-19 and C5 were prepared according to the following general procedure. Adhesive solution 1 was coated onto a release liner embossed with a square array pattern of depressions (the dimensions and density are given in Table HI) to provide an adhesive layer that had a dry thickness of 30-40 μm. 60 μm thick vinyl film was laminated to the adhesive layer on the liner to give a pressure sensitive adhesive film. The liner was removed and the adhesive surface examined under a microscope. Each sample showed an adhesive surface that substantially replicated the surface of the release liner. Adhesion and wet out values obtained for these examples are shown in Table III.

EXAMPLE 13

SCOTCHCAL brand, 3650 adhesive film was laminated to the film side of a sample from Example 3 and this composite was cut into 2.54 cm ×20 cm strips. The strips were aged (="baked") in the oven at 65° C. under a 370 gram weight. Microscopic inspection of the aged adhesive surface showed a pattern of adhesive pegs protruding approximately 20 μm above a smooth adhesive surface. The adhesive pegs substantially replicated the liner surface. The adhesive surface and adhesion behavior were like Example 3.

EXAMPLE C5

SCOTCHCAL brand, 3650 adhesive film was laminated to the film side of a sample from Example C1 and this composite was cut into 2.54 cm×20 cm strips. The strips were aged (baked) in the oven at 65° C. under a 370 gram weight. Microscopic inspection of the aged adhesive surface showed a smooth surface. The adhesive surface and adhesion behavior were like Example C 1.

EXAMPLE 14

The release liner from a sample of Example C1 was removed and a sample of the embossed release liner from Example 3 was laminated in its place. SCOTCHCAL brand, 3650 adhesive film was then laminated to the film side of the above sample and this composite was cut into 2.54 cm×20 cm strips. The strips were aged ("baked") in the oven at 65° C. under a 370 gram weight to impart a microstructure to the adhesive surface. Microscopic inspection of the adhesive surface showed a pattern of panially formed adhesive pegs protruding above a smooth adhesive surface. The wet out pattern on glass was similar to Example 13 but the bonding behavior was like Example C5.

EXAMPLE 15

Contact Aging Test

Samples of the adhesive film from Example 3 were prepared for peel adhesion testing and applied to cleaned anodized aluminum panels, as described in Example 1. The 180° peel back adhesion was measured after contact times of about 5 minutes and 24 hours at 22° C. The samples removed after 24 hours contact were examined under a microscope. The machined surface pattern of the aluminum test plates was clearly visible on the surface of the adhesive after peel back tests (24 hour contact aging). For samples applied using 180 grams force, the pattern was visible only on the tops of the adhesive pegs. For samples applied using 2 kg force, the pattern covered the entire adhesive surface.

EXAMPLES 16–19

Examples 16–19 illustrated that the size of the adhesive pegs could affect the amount of application force required to form a more permanent adhesive bond and to some extent the adhesion value obtained. Examples 16, 18 and 19 remained repositionable even when applied using a force of 2 kg. A squeegee had to be used to apply these films for a more permanent adhesive bond. The adhesion values obtained were slightly lower than in Examples 1-12, but the adhesives were still functional.

EXAMPLES 20–26 AND C6–C10

Examples 20–26 and C6–C10 illustrated the effect of varying the composition of the adhesive used, such as a harder, "drier" adhesive (adhesive solution 2), a more highly crosslinked adhesive (adhesive solution 5) and soft, very tacky, non-crosslinked adhesive (adhesive solution 3). Only the softer adhesive (Examples 22–24) required pegs >20 $\mu$m tall for good repositionable behavior. Additional crosslinking of the adhesive made the sample more repositionable when it was applied using low application force (Example 26 versus Example 3). Adhesion and wet out values obtained for these examples are summarized in Table IV.

EXAMPLES 20–22 AND C6–C7

Examples 20–22 and C6–C7 were prepared according to the following general procedure. Adhesive solution 2 was coated onto a release liner (for Examples 20–22, the liner was embossed with a square array pattern of depressions with the dimensions and frequency given in Table IV) to provide an adhesive layer that had a dry thickness of 30–40 $\mu$m. 60 $\mu$m thick vinyl film was laminated to the adhesive layer on the liner to give a pressure sensitive adhesive film. The liner was removed and the adhesive surface examined under a microscope. Each sample showed an adhesive surface that substantially replicated the surface of the release liner.

EXAMPLE 23–25 AND C8–C9

Examples 23–25 and C8–C9 were prepared according to the following general procedure. Adhesive solution 3 was coated onto a release liner (for Examples 23–25, the liner was embossed with a square array pattern of depressions with the dimensions and frequency given in Table IV) to provide an adhesive layer that had a dry thickness of 30–40 $\mu$m. 60 $\mu$m thick vinyl film was laminated to the adhesive layer on the liner to give a pressure sensitive adhesive film. The liner was removed and the adhesive surface examined under a microscope. Each sample showed an adhesive surface that substantially replicated the surface of the release liner.

EXAMPLE 26 AND C10

Examples 26 and C10 were prepared according to the following general procedure. Adhesive solution 5 was coated onto a release liner (for Example 26, the liner was embossed with a square array pattern of depressions with the dimensions and frequency given in Table IV) to provide an adhesive layer that had a dry thickness of 30–40 $\mu$m. 60 $\mu$m thick vinyl film was laminated to the adhesive layer on the liner to give a pressure sensitive adhesive film. The liner was removed and the adhesive surface examined under a microscope. Each sample showed an adhesive surface that substantially replicated the surface of the release liner.

EXAMPLES 27–34 AND C11–C13

Examples 27–29 illustrated that filling the adhesive pegs with glass beads gave a slidably positionable adhesive film that clung to a substrate. This combination of cling adhesion* and positioning behavior made it particularly easy to apply large sheets of adhesive films in precise registration. By contrast, Example C11 which had pegs that were composed of glass bead clusters with little or no adhesive between the beads, was positionable but did not exhibit cling adhesion.

Example 29 showed that good positionable and repositionable behavior was observed even when the composite pegs were substantially shorter than pegs composed only of adhesive (Example 4). Example 30 showed that the peg shape was also less critical for the composite pegs than for the all adhesive pegs (Example C4). Comparison of Example 31 and Example C12 showed that when the examples were prepared using liner with only partially bead filled depressions, adhesive having composite pegs (Example 31) afforded superior positionable behavior compared to adhesive having particle clump pegs (Example C12). In Example 31 the adhesive replaced the missing glass beads to afford an adhesive surface having composite pegs that substantially replicated the embossed liner surface. By comparison, Example C12 had only partial transfer of the small, poorly formed, glass bead clusters to the adhesive surface. The adhesion values obtained for Examples 27–31 following application with a 2 kg application force, were similar to those for Examples 3–6 and C2. This indicated that the composite pegs did not adversely affect bond strength.

Examples 32–34 showed that the beads need not be glass and matching the refractive index of the adhesive and beads improved the optical properties of applied adhesive films. The clear film Examples 32–34 were indistinguishable for application and bonding characteristics from Example 27. When applied to a polycarbonate plate using a 2 kg roll down weight and illuminated either (a) from the back or (b) from the plate edges, Example 33 was optically clear under all illumination conditions, Example 32 was optically clear under back illumination and slightly hazy under edge illumination and Example 34 was hazy under all illumination conditions.

Example C13 showed filling an adhesive with glass beads significantly smaller than the adhesive coating thickness greatly reduced the adhesive tack and bond strength.

EXAMPLES 27-29 AND 31-32

Examples 27-29, 31 and 32 were prepared according to the following general procedure. Adhesive solution 1 was coated onto a release liner to provide an adhesive layer that had a dry thickness of 30-40 μm. The liner had a square array pattern of depressions containing Potters 5000 SPHERIGLASS beads (from Potters Industries, Inc., Parisippany, h3), the dimensions and frequency of the depressions for each sample are given in Table V. 60 μm thick vinyl film was laminated to the adhesive layer on the liner to give a pressure sensitive adhesive film for Examples 27-29 and 31 . A 60 μm thick clear PET film was laminated to the adhesive layer on the liner to give a pressure sensitive adhesive film for Examples 32-34. The liner was removed and the adhesive surface examined under a microscope. Each sample showed an adhesive surface that substantially replicated the surface of the release liner. The pegs substantially replicated the liner surface depressions and were composed of glass beads in adhesive.

Electron micrographs of the adhesive surface showed composite pegs of glass beads in an adhesive matrix and the adhesive surface between the composite pegs was substantially free of beads.

When samples from Examples 27-29 and 31 were laid on or lightly pressed against a horizontal aluminum test plate, the sheet could be easily and repeatedly slid across or lifted off the surface. When the panel was held in a vertical position, the adhesive sheet clung, yet was easily slid across or lifted off the surface. Samples were lightly pressed against a glass plate and the wet out pattern examined under a microscope. It was observed that wet out occurred only at the tips of the "pegs" and that each circular wet out spot was approximately 75 μm in diameter and 30 to 90% wet out inside this spot. Adhesion and wet out values obtained for these examples are shown in Table V.

EXAMPLE 30

The release liner from a sample of 3M 180-10 CONTROLTAC brand adhesive film was removed and the depressions were filled with Potters 5000 SPHERIGLASS beads. Adhesive solution 1 was coated onto this bead filled release liner to provide an adhesive layer that had a dry thickness of 30-40 μm. 60 μm thick vinyl film was laminated to the adhesive layer on the liner to give a pressure sensitive adhesive film. Microscopic inspection of the adhesive surface showed a pattern of hemispherical shaped projections covering approximately 3% of the surface. The projections were approximately 25 μm tall and 50 μm in diameter and protruded above a smooth adhesive surface. The projections substantially replicated the liner surface depressions and are composed of glass beads in adhesive. Electron micrographs of the adhesive surface showed the projecting hemispheres consisted of glass beads in an adhesive matrix and the adhesive surface between the glass bead clusters was substantially free of buds. The initial contact (180 gram application force) wet out area on glass was low ( about 4% ) and consisted of small round spots. The wet out area did not increase significantly (180 gram application force) with prolonged contact (6 hours at 22° C.). This sample could be laid on a glass plate at 22C and freely slid over the surface, but did not freely slide when rolled down with a 180 gram force or when laid on a 40° C. glass plate. Although the sample was not positionable, it was readily repositionable under these latter application conditions. Adhesion and wet out values obtained for Example 30 are shown in Table V.

EXAMPLE C11

The smooth release liner was removed from a sample of Example C2 then a sample of embossed, release liner containing Potter's 5000 SPHERIGLASS beads was laminated to the adhesive (the same liner was used to prepare Example 27). The liner was removed and the sample laid on a horizontal aluminum test plate at 40° C. The sample sheet had no adhesion to the test plate and was easily slid across and lifted off the surface. The sample adhesive sheet fell off a vertical surface when an application force of 180 grams or less was used. The sample showed good adhesion when applied using a 2 kg application force. Adhesion and wet out values obtained for this Example is summarized in Table V. Electron micrographs of the projecting glass bead clusters showed they are substantially free of adhesive and the adhesive surface between the glass bead clusters was substantially free of beads.

EXAMPLE 31

The liner used for this example had depressions that were partially (about 25% of capacity) filled with Potters 5000 SPHERIGLASS beads. The film was prepared as described for Examples 27-29. Electron micrographs of the adhesive surface showed that the projecting composite pegs substantially replicated the liner surface and contain glass beads around the upper edges of the pegs. The beads in the pegs were covered by the adhesive and the adhesive surface between the pegs was substantially free of beads.

EXAMPLE C12

The smooth release liner was removed from a sample of Example C2 and a sample of embossed, release liner partially filled with Potter's 5000 SPHERIGLASS beads was laminated to the adhesive (the same liner was used to prepare Example 31). Microscopic analysis of the adhesive surface and liner showed only partial transfer of the glass bead clusters to the adhesive surface (approximately 75%) and many of the transferred clusters were partially formed. The sample sheet was very difficult to slide across a glass surface and tended to preadhere. The sample showed good adhesion when applied using a 2 kg application force. Adhesion and wet out values obtained for this Example is summarized in Table V.

EXAMPLE 32

Adhesive solution 1, having a dried refractive index of 1.47, was coated onto an embossed release liner containing MR-7G plastic beads (7 μm avenge diameter crosslinked polymethyl methacrylate beads having a refractive index of 1.49, from Soken Chemical and Engineering Co., Tokyo, Japan) in the depressions, as described in Example 27. The adhesive coated liner was dried and clear polyester film was laminated to the adhesive to give a self adhesive film on a release liner. Microscopic examination of the adhesive surface showed that bead filled adhesive pegs substantially replicated the liner surface. When laid on or lightly pressed against a horizontal polycarbonate test plate, the sheet was easily and repeatedly slid across or lifted off the surface. When the panel was held in a vertical position, the adhesive sheet clung, yet was easily slid across or lifted off the surface. The sample bonded tightly when applied to the polycarbonate plate using a 2 kg application force and displayed ply failure when removed. Example 32 was optically clear under back illumination and slightly hazy under edge illumination when mounted on a clear polycarbonate plate.

EXAMPLE 33

Plastic beads (3 $\mu$m avenge diameter crosslinked methyl methacrylate-vinyl acetate copolymer beads having a refractive index of 1.47, from 3M) were used to prepare a clear self adhesive film as in Example 32. Microscopic examination of the adhesive surface showed that adhesive pegs substantially replicated the liner surface. The beads were not visible using optical microscopy. Example 33 was optically clear under all illumination conditions when mounted on a polycarbonate plate.

EXAMPLE 34

Potter's 5000 SPHERIGLASS beads (7 $\mu$m average diameter glass beds having a refractive index of 1.51) were used to prepare a clear serf adhesive film as in Example 32. Example 34 was hazy under all illumination conditions when applied to a clear polycarbonate plate.

EXAMPLE C13

Adhesive solution 1 (30 parts) was mixed with Potter's 5000 SPHERIGLASS beads (70 parts) in ethyl acetate (140 parts) and then coated onto a smooth release liner to give an adhesive layer having a dry thickness of 30–40 $\mu$m. 60 $\mu$m thick vinyl film was laminate to the adhesive on the liner to give a pressure sensitive adhesive film. Electron micrographs of the adhesive surface showed the adhesive layer covered the glass beads like the composite pegs in Examples 27–30. When laid on a horizontal aluminum test plate, the sheet was easily slid over or lifted off the surface. When the panel was held in a vertical position, the adhesive sheet clung. Adhesion did not substantially increase with longer contact times, higher application pressure or heating.

EXAMPLE 35–40 AND C14

Examples 35–37 and C13 showed that other adhesives could be used to make the repositionable/permanent adhesive films. Example 37, like Example 8, showed noticeable telegraphing of the adhesive peg pattern through the film after application using 2 kg force. Examples 38–40 showed large plastic beads could be used and provided some control over the strength of the repositionable adhesive bond obtained.

EXAMPLE 35–37 AND C14

Adhesive solution 4 was coated onto release liner (for Examples 35–37, the liner was embossed with a square army pattern of depressions with the dimensions and frequency given in Table VI and containing Potter's 5000 SPHERICLASS beads in the depressions), and cured under UV light irradiation in an inert atmosphere. 60 $\mu$m thick vinyl film was laminated to the adhesive layer on the liner to give a pressure sensitive adhesive film. The liner was removed and the adhesive surface examined under a microscope. Each sample showed an adhesive surface that substantially replicated the surface of the release liner in each case. The projections substantially replicated the liner surface depressions and were composed of glass beads in adhesive. Application behavior was similar to Examples 27–29. Adhesion and wet out values obtained for these examples are shown in Table VI.

EXAMPLE 38

A solution of soft acrylic resin, NeoCryl A-1044 (Polyvinyl Chemicals Inc.), was coated onto release liner embossed with a square array pattern of 1120 depressions/cm$^2$, 20 $\mu$m deep, and the excess liquid was wiped from surface leaving material deposited in the depressions. The coated liner was dried. Microscopic inspection of the liner showed that each of the depressions was only partially filled (less than 20% by volume) with an irregular shaped bead of plastic. The plastic beads were typically oriented to one side of the depression.

Adhesive solution 5 was then coated onto the bead containing release liner to give an adhesive layer having a dry thickness of 30–40 $\mu$m. 60 $\mu$m thick vinyl film was laminated to the adhesive on the liner to give a pressure sensitive adhesive film. Electron micrographs of the adhesive surface showed substantially complete replication of the release liner surface and substantial coverage of the plastic bead.

EXAMPLE 39

NeoCryl A-1Cu. 4 latex resin (Polyvinyl Chemicals Inc.) was coated onto embossed release liner as described in Example 38. After drying, the coating process was repeated twice. Microscopic inspection of the liner showed each of the depressions was partially filled (approximately 50% by volume) with an irregular shaped bead of plastic. The plastic beads were typically oriented to one side of the depression.

A pressure sensitive adhesive film was prepared using this liner as described in Example 38. Electron micrographs of the adhesive surface showed the release liner surface was substantially replicated and the plastic bead was substantially covered with a thin layer of adhesive.

EXAMPLE 40

A hard but resilient latex resin, NeoCryl A-612 (Polyvinyl Chemicals Inc.), was coated onto embossed release liner and excess resin was wiped from surface as described in Example 38. Microscopic inspection of the liner showed each of the depressions was partially filled (less than 20% by volume) with an irregular shaped bead of plastic. The plastic beads were typically oriented to one side of the depression.

A pressure sensitive adhesive film was prepared using this liner as described in Example 38. Electron micrographs of the adhesive surface showed the release liner surface was substantially replicated and the plastic bead was substantially covered with a thin layer of adhesive.

EXAMPLE 41

This example showed an improvement in electronic cutter performance for adhesive films having the microstructured adhesive and liners. Upper and lower case letters were cut from samples of 3M 180-10 film with CONTROLTAG brand adhesive, and from films prepared according to Examples 3 and 27 using an electronically driven knife cutter (Gerber Scientific Products, Inc.). The minimum letter size which could be cut before "pop off" occurred was determined to be 2.8, 1.3, and 1.3 cm tall, for each film respectively. Liner adhesion for each sample was measured as 180° peel back at 230 cm/min. The values obtained were 8.7, 8.1 and 7.7 g/cm respectively.

Various modifications and alterations of this invention will become apparent to those skilled in the art without departing from the scope and spirit of this invention, and it should be understood that this invention is not to be unduly limited to the illustrative embodiments set forth herein.

TABLE II

| Sample | Slide Rating | Peg Dimension density/height lpi/μm | Peel Adhesion 180 g Roll Down kg/cm | Peel Adhesion 2 kg Roll Down kg/cm | Wet Out on Glass 180 g Roll Down % | Wet Out on Glass 2 kg Roll Down % |
|---|---|---|---|---|---|---|
| 1 | 3 | 85/30 | 0.5 | 1.3 | 7 | 94 |
| 2 | 3 | 85/24 | 0.6 | 1.3 | 10 | 98 |
| 3 | 3 | 85/20 | 0.6 | 1.3 | 11 | 100 |
| 4 | 4 | 85/15 | 0.9 | 1.3 | 4 | 96 |
| C1 | 4 | 0/3 | 1.2 | 1.3 | 94 | 98 |
| C2 | 4 | 0/1 | 1.4 | 1.4 | 95 | 99 |
| 5 | 3 | 65/30 | 0.6 | 1.3 | 2 | 98 |
| 6 | 3 | 65/20 | 0.5 | 1.3 | 3 | 100 |
| 7 | 4 | 65/15 | 1.0 | 1.4 | 4 | 95 |
| 8 | 3 | 40/36 | 0.5 | 1.3 | 7 | 93 |
| 9 | 3 | 40/25 | 0.6 | 1.2 | 4 | 96 |
| 10 | 3 | 40/20 | 0.5 | 1.2 | 6 | 89 |
| 11 | 3 | 40/17 | 0.5 | 0.9 | 3 | 86 |
| 12 | 4 | 40/13 | 0.8 | 0.9 | 6 | 88 |

TABLE III

| Sample | Slide Rating | Peg Dimension density/height lpi/μm | Peel Adhesion 180 g Roll Down kg/cm | Peel Adhesion 2 kg Roll Down kg/cm | Wet Out on Glass 180 g Roll Down % | Wet Out on Glass 2 kg Roll Down % |
|---|---|---|---|---|---|---|
| C3 | 4 | 65/26 | 1.1 | 1.3 | ~2 | ~98 |
| C4 | 4 | 180 liner | 1.0 | 1.2 | ~15 | ~98 |
| 13 (baked) | 3 | 85/20 | 0.5 | — | ~6 | — |
| C5 (baked) | 4 | 0/3 | 1.0 | — | ~90 | — |
| 14 | 4 | 85/20 | 0.9 | — | ~10 | — |
| 15 | 3 | 85/20 | 0.2 | 1.3 | — | — |
|  | 3 | (sample 3) | 0.3 | 1.3 | — | — |
| 16 | 2 | 35/50 (125 μm dia.) | 0.5 | 0.6* | — | — |
| 17 | 2 | 50/50 (125 μm/dia.) | 0.4 | 1.1 | — | — |
| 18 | 1 | 50/125 (250 μm dia.) | <0.04 | 0.8 | — | — |
| 19 | 2 | 50/125 (250 μm dia.) | 0.4 | 0.8 | — | — |

5 minute contact before peel test; 24 hours contact before peel test; *1.1 kg/cm with squeegee application; 1.2 kg/cm with squeegee application

TABLE IV

| Sample (Adhesive) | Slide Rating | Peg Dimension density/height lpi/μm | Peel Adhesion 180 g Roll Down kg/cm | Peel Adhesion 2 kg Roll Down kg/cm | Wet Out on Glass 180 g Roll Down % | Wet Out on Glass 2 kg Roll Down % |
|---|---|---|---|---|---|---|
| 20(2) | 2 | 65/30 | 0.4 | 1.2 | ~6 | ~98 |
| 21(2) | 3 | 65/20 | 0.6 | 1.2 | ~5 | ~99 |
| 22(2) | 4 | 65/15 | 1.1 | 1.3 | ~5 | ~98 |
| C6(2) | 4 | 0/1 | 1.2 | 1.4 | ~70 | ~95 |
| C7(2) | 4 | 0/3 | 1.0 | 1.3 | ~75 | ~95 |
| 23(3) | 3 | 65/30 | 0.7 | 1.4 | 6 | 97 |
| 24(3) | 4 | 65/20 | 1.1 | 1.4 | 6 | 99 |
| 25(3) | 4 | 65/15 | 1.2 | 1.4 | — | — |
| C8(3) | 4 | 0/3 | 1.4 | 1.4 | ~95 | ~98 |
| C9(3) | 4 | 0/1 | 1.3 | 1.4 | ~90 | ~97 |
| 26(5) | 2 | 85/20 | 0.3 | 0.9 | ~8 | ~99 |
| C10(5) | 4 | 0/3 | 0.5 | 0.9 | ~90 | ~95 |

TABLE V

| Sample (Adhesive) | Slide Rating | Peg Dimension density/height lpi/μm | Peel Adhesion 180 g Roll Down kg/cm | Peel Adhesion 2 kg Roll Down kg/cm | Wet Out on Glass 180 g Roll Down % | Wet Out on Glass 2 kg Roll Down % |
|---|---|---|---|---|---|---|
| 27(1) | 1 | 85/20 | <0.01 | 1.3 | ~2 | ~98 |
| 28(1) | 1 | 85/16 | <0.01 | 1.2 | ~2 | ~97 |

TABLE V-continued

| Sample (Adhesive) | Slide Rating | Peg Dimension density/height lpi/μm | Peel Adhesion 180 g Roll Down kg/cm | Peel Adhesion 2 kg Roll Down kg/cm | Wet Out on Glass 180 g Roll Down % | Wet Out on Glass 2 kg Roll Down % |
|---|---|---|---|---|---|---|
| 29(1) | 2 | 85/12 | <0.01 | 1.1 | 3 | 97 |
| C11(1) | 1 | 85/20 | 0.0 | 1.2 | ~0 | ~95 |
| 31(1) | 1 | 85/17 | <0.01 | 1.2 | ~1 | ~98 |
| C2(1) | 4 | 0/1 | see example C2 | | | |
| C12(1) | 3 | 85/17 | 0.3 | 1.4 | ~2 | ~98 |
| 30(1) | 2 | (180 liner) | 0.3 | 1.2 | ~4 | ~98 |
| 32(1) | — | 85/20 | Refractive index matching of beads and PSA improved | | | |
| 33(1) | — | 85/20 | optical properties. Peel adhesion and positonability | | | |
| 34(1) | — | 85/20 | qualitatively were the same as glass bead examples. | | | |

TABLE VI

| Sample (Adhesive) | Slide Rating | Peg Dimension density/height lpi/μm | Peel Adhesion 180 g Roll Down kg/cm | Peel Adhesion 2 kg Roll Down kg/cm | Wet Out on Glass 180 g Roll Down % | Wet Out on Glass 2 kg Roll Down % |
|---|---|---|---|---|---|---|
| 35(4) | 1 | 65/40 | <0.01 | 0.7 | — | — |
| 36(4) | 1 | 65/27 | <0.01 | 0.7 | ~4 | ~95 |
| 37(4) | 2 | 65/16 | 0.03 | 0.7 | — | — |
| C14(4) | 4 | 0/1 | 0.7 | 0.7 | — | — |
| 38(5) | 2 | 85/20 | 0.2 | 1.0 | ~5 | ~97 |
| 39(5) | 2 | 85/20 | 0.1 | 0.9 | ~3 | ~97 |
| 40(5) | 2 | 85/20 | 0.3 | 0.8 | ~5 | ~98 |
| 26(5) | 2 | 85/20 | 0.3 | 0.9 | ~8 | ~99 |
| C10(5) | 4 | 0/3 | 0.5 | 0.9 | ~90 | ~95 |

We claim:

1. A method of preparing an adhesive article comprising the steps:
   (a) preparing a slurry of beads;
   (b) coating the slurry onto an embossed liner to fill depressions in the embossed liner;
   (c) wiping the embossed liner to remove excess slurry;
   (d) coating the filled embossed liner with an adhesive solution; and
   (e) allowing the adhesive solution to absorb into and around the beads before drying.

2. The method of preparing an adhesive article according to claim 1 wherein the adhesive solution is a latex adhesive solution.

3. The method of preparing an adhesive article according to claim 1, comprising the steps:
   (a) preparing a slurry of beads;
   (b) coating the slurry onto an embossed liner to fill depressions in the embossed liner;
   (c) wiping the embossed liner to remove excess slurry;
   (d) wherein the adhesive solution contains a diluent and the diluent is a reactive monomer 4. A method of preparing an adhesive article, comprising the steps:
   (a) coating a latex resin onto an embossed liner to partially fill the liner;
   (b) wiping the embossed liner to remove excess latex resin;
   (c) drying the resin to partially dry or coalesce the latex resin;
   (d) coating the partially filled embossed liner with an adhesive solution; and
   (e) allowing the adhesive solution to adsorb into and around the partially dried or coalesced latex resin before drying.

5. The method of preparing an adhesive article according to claim 4, comprising the steps:
   (a) coating a latex resin onto an embossed liner to partially fill the liner;
   (b) wiping the embossed liner to remove excess latex resin;
   (c) drying the resin to partially dry or coalesce the latex resin;
   (d) wherein the adhesive solution is a latex adhesive solution.

* * * * *

UNITED STATES PATENT AND TRADEMARK OFFICE
CERTIFICATE OF CORRECTION

PATENT NO.: 5,362,516
DATED: November 8, 1994
INVENTOR(S): Wilson et al.

It is certified that error appears in the above-identified patent and that said Letters Patent is hereby corrected as shown below:

Col. 1, line 15, Delete "rims" and insert --films--

Col. 1, line 19, Delete "'" and insert --"--

Col. 2, line 11, Delete the space between the "9" and "1"

Col. 2, line 40, Delete "rims" and insert --films--

Col. 2, line 48, Insert a space between "microstructured" and "adhesive"

Col. 3, line 44, Delete "'" and insert --"--

Col. 3, line 56, Delete "'" and insert --"--

Col. 4, line 11, Delete "'" and insert --"--

Col. 4, line 49, Delete "fiat" and insert --flat--

Col. 4, line 65, Delete "den-act" and insert --detract--

Col. 4, line 68, Delete "Illustrated" and insert --illustrated--

Col. 5, line 27, Delete "our, yard" and insert --outward--

Col. 5, line 52, Delete "fiat" and insert --flat--

Col. 7, line 22, Delete "coat,g" and insert --coating--

Col. 7, line 51, Delete "fiat" and insert --flat--

Col. 8, line 50, Delete "an" and insert --art--

Col. 8, line 59, Delete "an" and insert --art--

UNITED STATES PATENT AND TRADEMARK OFFICE
CERTIFICATE OF CORRECTION

PATENT NO.: 5,362,516

DATED: November 8, 1994

INVENTOR(S): Wilson et al.

It is certified that error appears in the above-identified patent and that said Letters Patent is hereby corrected as shown below:

Col. 9, line 5, Delete "of." and insert --cf.--

Col. 9, line 10, Delete "of." and insert --cf.--

Col. 9, line 68, Delete "mounts" and insert --amounts--

Col. 10, line 28, Delete "his" and insert --bis--

Col. 10, line 36, Delete "1045" and insert --10-45--

Col. 10, line 39, Delete "05.5:4.5) and insert --(95.5:4.5)--

Col. 10, line 48, Delete "pans" and insert --parts--

Col. 10, line 49, Delete "pain" and insert --parts--

Col. 10, line 51, Delete "pans" and insert --parts--

Col. 11, line 5, Delete "convened" and insert --converted--

Col. 11, line 45, Insert --"-- after "PrepSol"

Col. 11, line 52, Delete "180peel" and insert --180° peel--

Col. 11, line 57 and 58, Delete "cling adhesion" and insert --"cling adhesion--

Col. 11, line 60, Delete "Of" and insert --of--

Col. 12, line 2, Delete "lateraly" and insert --laterally--

Col. 12, line 2, Replace second " with --"--

Col. 12, line 4, Delete "2'" and insert --"2"--

Col. 12, line 7, Delete "reposifioned" and insert --repositioned--

Col. 12, line 20, Delete "digifixing" and insert --digitizing--

Col. 12, line 44, Delete "I" and insert --1--

Col. 12, line 47, Delete "ID" and insert --II--

Col. 13, line 20, Delete "Liner" and insert --liner--

Col. 13, line 21, Delete "avenge" and insert --average--

UNITED STATES PATENT AND TRADEMARK OFFICE
CERTIFICATE OF CORRECTION

PATENT NO.: 5,362,516

DATED: November 8, 1994

INVENTOR(S): Wilson et al.

It is certified that error appears in the above-identified patent and that said Letters Patent is hereby corrected as shown below:

Col. 13, line 23, Delete "avenge" and insert --average--

Col. 13, line 55, Delete "IH" and insert --III--

Col. 13, line 58, Delete "proraided" and insert --protruded--

Col. 14, line 12, Delete "consisteft" and insert --consisted--

Col. 14, line 21, Delete "HI" and insert --III--

Col. 14, line 36, Delete "(=baked")" and insert --("baked")--

Col. 14, line 65, Delete "panially" and insert --partially--

Col. 16, line 22, Delete """ and insert --" "-- around cling adhesion

Col. 16, line 58, Delete "Co)" and insert --(b)--

Col. 17, line 9, Delete "h3" and insert --NJ--

Col. 17, line 59, Delete "buds" and insert --beads--

Col. 17, line 65, Delete "22C" and insert --22°C--

Col. 18, line 55, Delete "avenge" and insert --average--

Col. 19, line 9, Delete "avenge" and insert --average--

Col. 19, line 23, Delete "serf" and insert --self--

Col. 19, line 33, Delete "laminate" and insert --laminated--

Col. 20, line 26, Delete "1Cu. 4" and insert --1044--

Col. 20, line 60, Delete "CONTROLTAG" and insert --CONTROLTAC--

UNITED STATES PATENT AND TRADEMARK OFFICE
CERTIFICATE OF CORRECTION

PATENT NO.: 5,362,516

DATED: November 8, 1994

INVENTOR(S): Wilson et al.

It is certified that error appears in the above-identified patent and that said Letters Patent is hereby corrected as shown below:

Col. 22, Table III, For Sample 15 insert --†-- after "0.2" and "0.3"; insert --‡--after "1.3" and "1.3";

For Sample 18 insert --⊗-- after "0.8"; insert --†-- before "5 minute"; insert --‡-- before "24 hours"; subscript the asterik before the "1.1"; and insert --⊗-- before the 1.2 Kg/cm Col. 23, line 47-53, Delete "comprising the steps...(d)"

Col. 24, line 44-51, Delete "comprising the steps...(d)"

Signed and Sealed this

Twenty-fourth Day of October, 1995

Attest:

BRUCE LEHMAN

Attesting Officer

Commissioner of Patents and Trademarks